United States Patent
Meriano et al.

[15] 3,698,507
[45] Oct. 17, 1972

[54] DIRECTION AND BRAKING CONTROL FOR FLUID CUSHION VEHICLES

[72] Inventors: Albert P. Meriano, Fair Oaks; Giles A. Fuller; William H. Knuth, both of Sacramento, all of Calif.

[73] Assignee: Aerojet-General Corporation, El Monte, Calif.

[22] Filed: May 15, 1970

[21] Appl. No.: 37,544

[52] U.S. Cl. ...................180/119, 180/124, 188/5
[51] Int. Cl. .........................B60v 1/00, B60v 1/14
[58] Field of Search......................180/119, 127, 124

[56] References Cited

UNITED STATES PATENTS

| | | | |
|---|---|---|---|
| 3,653,458 | 4/1972 | Donlon | 180/124 |
| 3,272,275 | 9/1966 | Faure | 180/127 |
| 3,321,038 | 5/1967 | Mackie et al. | 180/124 |
| 3,330,384 | 7/1967 | Bertin et al. | 180/119 X |
| 3,524,517 | 8/1970 | La Fleur | 180/119 X |

Primary Examiner—A. Harry Levy
Attorney—Edward O. Ansell and D. Gordon Angus

[57] ABSTRACT

A fluid cushion vehicle of the type provided with a number of cushion cells beneath it which by the force of fluid such as compressed air sent through them, cause the vehicle to hover above the terrain, water, ice or similar supporting medium, has one or more of its cushion cells arranged as a control cell, and provided with a flexible diaphragm within the cell in the general shape of a cone when distended. The bottom rim of the diaphragm is fixed within the cushion cell near the lower rim of the cell and the upper part or apex of the diaphragm can be held distended upwardly by a cable attachment. Fluid under pressure, such as compressed air, is sent into the cell above the diaphragm and is allowed to pass through holes in the diaphragm and out the bottom of the cell, thereby putting fluid pressure above the diaphragm. The control cell can be used for braking or steering by releasing the cable to lower the diaphragm sufficiently to drag along the terrain, or other supporting surface.

4 Claims, 2 Drawing Figures

PATENTED OCT 17 1972

3,698,507

ALBERT P. MERJANO
GILES A. FULLER
WILLIAM H. KNUTH
INVENTORS

BY D. Gordon Angus
ATTORNEYS

DIRECTION AND BRAKING CONTROL FOR FLUID CUSHION VEHICLES

This invention relates to cushion cells for fluid cushion vehicles, and has for an object to provide for steering and braking control on such a vehicle.

Fluid cushion vehicles, sometimes known as "Ground Effect Vehicles" commonly comprise a vehicle body or frame having cells which provide a cushion of pressurized fluid, such as air, between the vehicle and the surface over which it travels, for the purpose of providing lift for the vehicle. The pressurized fluid is ordinarily provided by a fluid compression means, usually an air compressor, which sends the pressurized fluid such as air into the cushion cells located at the bottom of the vehicle such that the pressure of the fluid from beneath the cushion cells provides sufficient lift for the vehicle to raise it above the surface such that the fluid, ordinarily air, escapes from beneath the vehicle through the space between the bottom of the cells and the surface, created by the lift. Such vehicles are ordinarily capable of hovering above the terrain or water and are commonly provided with suitable drive mechanisms such as fluid jets or fluid propellers to propel the vehicle in some direction.

It is desirable to provide means for steering such a vehicle and also for braking it to slow down or stop its motion in the direction in which it is moving. In accordance with the present invention, such a steering and braking control means is provided.

The invention is carried out by providing a cushion cell or cells of the vehicle with a flexible diaphragm within the wall or skirt of the cell, which can be held at an upper part thereof by suitable means so that it flairs outwardly and downwardly toward the lower rim of the cell skirt.

According to a preferred feature the lower part of the diaphragm is attached near the lower rim of the cell skirt. The flexible diaphragm is thus located within the cell such that the compressed fluid or air flowing into the cell from above acts on the outer upper surface of the diaphragm. The material of the diaphragm is provided with a number of openings which will allow the compressed fluid or air to pass through the diaphragm to its inside, thereby reaching the lower part of the cell from where it can escape from beneath the cell.

When the material of the diaphragm is extended by holding up the upper part thereof, the cell performs its function as a cushion cell but does not have effect in steering or braking the vehicle. When it is desired to steer or provide braking effect for the vehicle, the material of the diaphragm is allowed to drop down out of its extended shape so that the diaphragm collapses in somewhat of a bag shape and drops down below the cell to drag in the water or on the ground over which the vehicle is moving. This will result in directional and/or braking control of the vehicle.

According to a preferred feature, at least a part of the diaphragm material is covered with an abrasive resistant material where it can come into contact with the surface during a controlling operation.

According to another preferred feature, the diaphragm is in the form of a cone, or similar to a cone, with the apex upward.

The foregoing and other features of the invention will be better understood from the following detailed description and the accompanying drawing of which:

Figure 1:
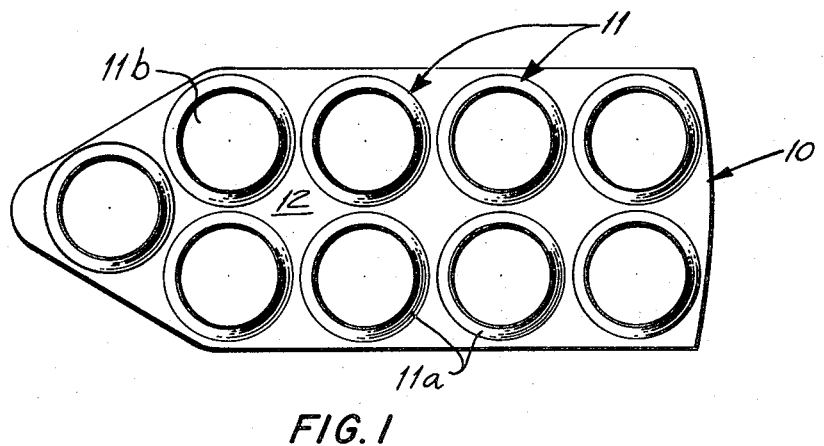
FIG. 1 illustrates a general form of the underside of a cushion fluid vehicle, in which the present invention may be incorporated.

FIG. 1 shows a view from the bottom of a general form of an air cushion vehicle having a frame 10 which supports a number of cushion cells 11, disposed around the periphery beneath the underside of the frame support 10. Details of all these cells and their attaching means to the frame are not shown as such details are not part of this invention. It is sufficient to state for the present purpose that the cushion cells are in the general form of cavities or chambers formed by walls or skirts 11a ordinarily of flexible material, located beneath the vehicle and provided with openings 11b at the bottoms of the chambers. The cell skirts are of a frusto-conical form the lower rims of which are of a generally circular form. The frame will support a floor or partition 12 below which the cushion cells extend and means is provided for sending compressed air into each of the cushion cells from a suitable conduit (not shown) located above the partition 12. Due to the proximity of the cells to the terrain over which the vehicle travels, fluid pressure builds up in the cells, expanding the cells and extending their skirts and urging the skirts toward and ordinarily against each other, and the pressure acting upwardly against the bottom of the vehicle raises it somewhat off the terrain so that fluid escapes from between the bottoms of the cells and the terrain. Also, if desired, compressed fluid or air may be sent from a suitable conduit means through the partition 12 from above so that the area beneath the partition 12 bounded by the cushion cells will be pressurized with air.

Figure 2:
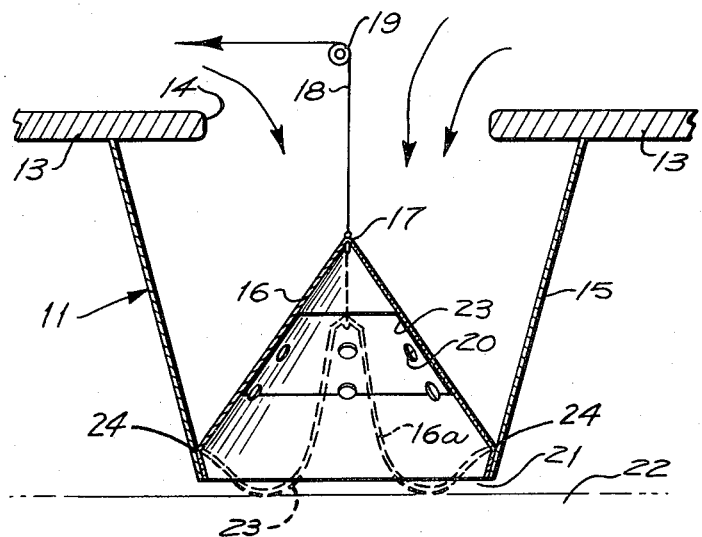
FIG. 2 is a cross-section side view of a cushion cell which may be used in the vehicle of FIG. 1 and which includes the present invention.

For the purpose of the present invention, some one or more, usually several, of the cushion cells will be constructed as a control cell according to the present invention, and FIG. 2 shows a construction which may be used for this purpose. FIG. 2 shows a partition member 13 which may be the same as member 12 in FIG. 1, this partition being provided with a substantial opening 14 through which fluid, ordinarily compressed air, is forced as shown by the arrows, from a source, ordinarily an air compressor (not shown), surrounding the opening 14, which will ordinarily, but not necessarily be circular. An air cushion cell in the form of a skirt 15 of a suitable flexible material or membrane having a frusto-conical form is attached in a substantially airtight manner to the underside of partition 13 with the larger diameter end of the conical frustum secured to the partition around the opening 14 so as to receive all of the compressed air which goes through the opening. A diaphragm 16 of a flexible material in the shape of a cone when extended, is secured within the cell 15 with the large open end of the cone attached within the skirt of the cell near the lower rim of the skirt, such that the apex of the cone points upwardly when the cone is extended and is substantially centered in respect to the center of the opening 14. The attachment, shown at points 24, may be made by glueing, stitching or any combination of these or other attachment means. When extended, the apex 17 will preferably be positioned at or somewhat below the level of partition 13.

Cable 18 attached to the apex 17 passes over a pulley 19 and is carried to a suitable operating mechanism or arm which is capable of pulling the apex upwardly or allowing it to drop.

The conical member 16 is provided with a number of openings 20 which will allow the compressed air in the region above the cone to pass through the cone to the lower open end of the cell 15 so that it can escape through a clearance space 21 which exists between the lower end of the cushion cell and the surface 22 during normal operation, and thus contributes along with the other cells to the lift of the vehicle.

It is not essential to have these openings 20, however, as the device can function to steer or produce a braking effect without the openings. But unless some means is provided for releasing the compressed air from beneath the skirt, the cell 15 will not contribute to the lift of the vehicle, unless direct contact of the closed cell with the supporting surface is permitted.

During operation of the vehicle over the supporting surface, all of the cushion cells of the vehicle will normally be receiving compressed air from above, which will result in the lift of the vehicle, and assuming that the vehicle is moving, its direction or rate of movement relative to the surface may be controlled by releasing the cable 18 which will cause the material of cone 16 to drop down under pressure of the compressed air above it and assume a position represented by the dotted line 16a, there will be pressure applied to the upper surface of diaphragm 16 because the area of openings 20 is insufficient to release all the pressure above the diaphragm, this causes the member 16 to rub along the surface, thereby slowing down the vehicle at this position.

If the control cell shown in FIG. 2 is located at one side of the vehicle, the effect will be to reduce the speed of the vehicle at that side as compared with the other side, which will turn it, much as a boat is turned by turning its rudder to one side. Assuming there is a cell on each side of the vehicle constructed according to FIG. 2, and that the cables 18 of both cells are released to the same extent, the direction of movement of the vehicle will not be substantially affected, but the vehicle will be slowed down or brought to a stop. This is the braking action. If the cable for the cell on one side is released while the cable for the cell at the other side is not released to the corresponding extent, the vehicle will be turned toward one side, this being the steering action.

Because of the abrasive effect of the member 16 rubbing along the surface when the cable is released, it will be desirable to affix a relatively hard tough material 23 at the area of contact with the terrain. Such material may be of hard rubber or the like.

The braking or turning force may be controlled by the amount of lowering of the cable, which will control the amount of contact area of the diaphragm with the surface, thereby the deceleration or the turning radius, as the case may be.

It will be recognized that any number of these control cells may be applied to the vehicle in any desired positions to produce steering or braking control effects as may be desired.

What is claimed is:

1. In combination with a cushion cell for a fluid cushion vehicle having a rigid member spaced from and adapted to move over a rigid or fluid surface, said cell being of a type comprising a flexible skirt secured at its upper end to the underside of said rigid member and depending therefrom, said skirt being open at the bottom and expandable when subjected to fluid pressure: a flexible diaphragm within the skirt, said diaphragm having an outer portion attached to the inner periphery of the skirt near and above the lower rim of the skirt and at a vertically spaced distance from said underside, said diaphragm having a cross-sectional area which is larger than the cross-sectional area circumscribed by said skirt in planform through the line of attachment to said diaphragm and dividing said cell into an upper part and a lower part, said diaphragm having an interior region which can be drawn upward to a higher level than the level of its said attachment, said diaphragm being provided with opening means through which pressurized fluid admitted to said upper part passes to said lower part, and means secured to the interior region of said diaphragm for selecting the position of said interior region at an upper level approaching said underside, said level being higher than the level of attachment of said diaphragm and approaching a limit decreasing said vertically spaced distance so that the lower rim of the skirt is correspondingly elevated above said surface whereby the contribution to lift of that cushion cell is substantially zero, said secured means also permitting release of said diaphragm to a lower limit wherein at least part of said interior region drops to a position below said lower rim, and can drag on the surface to control the vehicle.

2. A combination according to claim 1 in which the securing means comprises a cable.

3. A combination according to claim 2 in which the bottom opening of the cell skirt is of smaller area than its upper portion.

4. A combination according to claim 1 in which an abrasion-resistant material is attached to the surface of the said last mentioned interior region which comes into contact with the surface over which said vehicle travels when the diaphragm is lowered.

* * * * *